(12) United States Patent
Munksø

(10) Patent No.: US 9,334,019 B2
(45) Date of Patent: May 10, 2016

(54) VEHICLE WITH SHAFT TRANSMISSION AND ELECTRIC MOTOR

(71) Applicant: Lars Munksø, Silkeborg (DK)

(72) Inventor: Lars Munksø, Silkeborg (DK)

( * ) Notice: Subject to any disclaimer, the term of this patent is extended or adjusted under 35 U.S.C. 154(b) by 0 days.

(21) Appl. No.: 14/412,325

(22) PCT Filed: Jun. 25, 2013

(86) PCT No.: PCT/DK2013/050210
§ 371 (c)(1),
(2) Date: Dec. 31, 2014

(87) PCT Pub. No.: WO2014/005590
PCT Pub. Date: Jan. 9, 2014

(65) Prior Publication Data
US 2015/0158552 A1 Jun. 11, 2015

(30) Foreign Application Priority Data
Jul. 4, 2012 (DK) .................................. 2012 70394

(51) Int. Cl.
| | | |
|---|---|---|
| *B62M 11/14* | (2006.01) | |
| *B62M 6/55* | (2010.01) | |
| *B62M 6/60* | (2010.01) | |
| *B62M 17/00* | (2006.01) | |
| *B62M 6/50* | (2010.01) | |
| *B62M 6/90* | (2010.01) | |

(52) U.S. Cl.
CPC ............... *B62M 11/145* (2013.01); *B62M 6/50* (2013.01); *B62M 6/55* (2013.01); *B62M 6/60* (2013.01); *B62M 6/90* (2013.01); *B62M 17/00* (2013.01); *Y02T 10/7258* (2013.01)

(58) Field of Classification Search
CPC .................................. B62M 6/45; B62M 6/55
See application file for complete search history.

(56) References Cited

U.S. PATENT DOCUMENTS

| | | | | |
|---|---|---|---|---|
| 5,857,537 | A * | 1/1999 | Matsumoto .............. | B62M 6/60 180/206.2 |
| 8,256,554 | B2 * | 9/2012 | Chan ........................ | B62M 6/45 180/206.4 |
| 2008/0156564 | A1 * | 7/2008 | Driessen .................... | B62J 7/04 180/220 |
| 2009/0200096 | A1 * | 8/2009 | Pittman .................... | B62M 6/25 180/205.5 |

FOREIGN PATENT DOCUMENTS

| | | |
|---|---|---|
| EP | 0 675 037 A1 | 3/1995 |
| EP | 0 729 881 A1 | 9/1996 |
| EP | 0 976 649 A2 | 2/2000 |
| JP | 05-058379 A | 3/1993 |
| JP | 2001-0213381 A | 8/2001 |
| WO | 2007/013742 A2 | 2/2007 |
| WO | 2011/061049 A1 | 5/2011 |
| WO | 2012/060476 A1 | 5/2012 |

* cited by examiner

*Primary Examiner* — Kevin Hurley
(74) *Attorney, Agent, or Firm* — Roberts Mlotkowski Safran & Cole, P.C.; Davis S. Safran

(57) ABSTRACT

A vehicle with a driveshaft transmission system having a driveshaft and a hub at a wheel of the vehicle, a battery pack and an electric motor for propelling the vehicle arranged at the driveshaft as well as a driveshaft transmission system. The electric motor can be a motor of the external rotor type having an inner stator part and an outer rotor part, the inner stator part having a central passage for the driveshaft. The driveshaft transmission system has an auxiliary motor with a planetary gear and a one-way overrunning clutch, the one-way overrunning clutch and the planetary gear being arranged between the driveshaft and the rotor part.

13 Claims, 6 Drawing Sheets

VEHICLE WITH SHAFT TRANSMISSION AND ELECTRIC MOTOR

BACKGROUND OF THE INVENTION

1. Field of the Invention

The present invention relates to a vehicle comprising a driveshaft transmission system, comprising a driveshaft and a hub at a wheel of said vehicle, where said vehicle further comprises a battery pack and an electric motor for propelling said vehicle, said electric motor being arranged at said driveshaft. The invention further relates to a method for controlling a vehicle comprising a driveshaft transmission system and an electric motor.

2. Description of Related Art

It is commonly known to arrange a driveshaft on a bicycle instead of a more common and cheap drive chain connecting a front sprocket at the crank to a rear sprocket at the hub on the rear wheel. Using a drive shaft solution provides a number of advantages, one very important advantage being that the solution is more or less maintenance-free. Another advantage of the driveshaft transmission is that it provides a very simple and sophisticated solution that can easily be combined with a smart design, and of course that the use of trouser clips or chain guard is no longer necessary as the movable and greasy parts are hidden inside the driveshaft construction.

Further it is also commonly known to arrange an electric auxiliary motor on a bicycle to assist the user while pedalling. In the various countries there are different rules and laws stating how such an auxiliary motor may be operated, but it is very common that the user of the bicycle needs to be pedalling—to apply some torque on the crank—to allow the electric auxiliary motor to assist.

Over the last years it has become more and more popular to ride such bicycles with an electric auxiliary motor, but still there is a strong desire to have a bicycle with an stylish and simple design, which is very often not the case with bicycles with electric auxiliary motors placed in the crank area as they tend to appear rather clumsy as the auxiliary motor are quite big.

Japanese Patent Application JP 5058379 A by Yamaha Motor Co. Ltd. discloses a bicycle having a driveshaft transmission and where an electric auxiliary motor of the internal rotor type is built into the crank of the bicycle. As the electric motor is arranged in the crank it needs to transmit its power to the crank shaft running at a relatively low rpm. This is a very demanding task as it is commonly known that electric motors running with a low number of revolutions will only be able to transfer a very low torque.

From Japanese Patent Application JP 2001213381 by Honda Motor Co. Ltd., another bicycle with electric auxiliary motor of the internal rotor type and a driveshaft construction is known. In this solution, the auxiliary power can come from one or two electric motors arranged directly at the shaft. In order to let the shaft run with a higher number of revolutions, a rather large gear transmission is arranged in the crank and the electric motor has a rather small diameter which, as in the Yamaha document, leaves the bicycle with a ineffective auxiliary motor that cannot provide the torque required to propel or at least assist the person using the bicycle in a proper manner. Also, in this Honda document the crank is rather complex and clumsy as the mentioned large gear need to be there and also a one-way clutch is installed inside the crank.

Both the mentioned bicycles with shaft transmission and with an electric auxiliary motor of the internal rotor type have a very special crank design and a rather inefficient use of the electric motor. In order to produce such bicycles, a rather complex design work has to be done as the complete transmission system is more or less special and different compared to a standard bicycle transmission system using a drive shaft.

SUMMARY OF THE INVENTION

It is the object of the invention to provide a vehicle with a driveshaft transmission, where the vehicle has an electric motor arranged in a driveshaft unit and working on one or more wheels of said vehicle, e.g. on a rear wheel of a bicycle, where said wheel is driven by the transmission system. Furthermore, it is the purpose to provide a vehicle/bicycle with an stylish and discreet electric auxiliary motor, where the driveshaft and the auxiliary motor comprise a unit installed between a more or less ordinary crank box and wheel hub, both designed for a driveshaft transmission.

The invention relates to a bicycle as indicated in the introduction, where the motor is an external rotor type, comprising a inner stator part and a outer rotor part, said inner stator part having a central passage for said driveshaft, where said driveshaft transmission system comprising said auxiliary motor further comprises a planetary gear and a one-way overrunning clutch, said one-way overrunning clutch and said planetary gear being arranged between the driveshaft and the rotor part.

A vehicle comprising a driveshaft transmission system according to the invention can be a bicycle where energy exerted by a user on pedals is transformed into rotary energy for rotating a crank, a driveshaft and a hub in a wheel of said bicycle, where said bicycle further comprises a battery pack and where said electric motor is an electric auxiliary motor for assisting said user, said auxiliary motor being arranged at said driveshaft.

Implementing a (auxiliary) motor of the external rotor type have proven very useful and effective as an auxiliary motor for a vehicle/bicycle, as the motor delivers more torque compared to a standard electric motor with a internal rotor due to the greater distance from the inner shaft to the outer rotating permanent magnets. On this type of motor the stator comprising the copper windings is arranged inside the rotor and the permanent magnets on the rotor are arranged at the rotor rotating at the outside of said stator.

While having the highly wanted high and constant torque, using an external rotor type motor also provides the option of a rather compact, slim and narrow motor construction, which is another very attractive benefit from this motor type.

Furthermore, an external rotor type motor is considered as a long-life and maintenance-free construction which is effective when it comes to producing power for a specific purpose, but also when it comes to managing the heat produced during operation. Especially when the motor is operated at low or varied speeds, heat management, i.e. cooling, becomes very important as an electric auxiliary motor for a bicycle will be operated at a speed which is relative to the input from the user. A motor of this type is also a very quiet motor, which also is very attractive when used on a bicycle as the original and well known characteristics of a traditional bicycle is still wanted and by most users taken for granted.

The invention comprises a vehicle e.g. a bicycle having two or three wheels and an electric auxiliary motor, but also other types of vehicles that are propelled by said electric motor only, e.g., an electric moped or scooter or such type of vehicle.

In the text below, examples of a vehicle of the bicycle type will be discussed.

By a bicycle comprising a driveshaft transmission system according to the invention, the rotor part is not "dragged" along while pedalling when the power for the motor is off, or while more power is exerted by the pedals than by the motor. This is obtained by the one-way overrunning clutch installed between the driveshaft and the outer rotor part. Only when the motor is engaged it will perform and assist the user to an easier ride. When the user stops pedalling, the overrunning clutch will step into action and allow a free-wheeling function to work.

The motor will only transfer power to the shaft of the bicycle if the shaft is rotated by the user. If the shaft is rotated by the user with a certain number of revolutions per minute (RPM) which are higher than the RPM transferred from the motor to the shaft, the overrunning clutch will ensure that the shaft is allowed to rotate freely without dragging the rotor along. If the shaft is rotated by the motor with at an RPM which is higher than the RPM generated by the user to the shaft, the overrunning clutch will ensure that the shaft is allowed to rotate freely without dragging the pedals along.

As such a motor is typically designed for a nominal number of RPM's of e.g. 3200 RPM, the motor RPM has to be adjusted to the shaft RPM, typically about 200 RPM. For that purpose a planetary gear is arranged between the driveshaft (output driveshaft) and the outer rotor part. The planetary gear allows the motor to be operated at e.g. 3200 RPM at the same time as the driveshaft is running at e.g. 200 RPM, allowing the motor and thus the transmission to perform better and more efficient and with a higher torque.

The planetary gear can be made as a two-stage planetary gear where the first stage has a ratio of 4 to 1 and where the second stage also has a ratio of 4 to 1. This will provide the advantage of distributing the load on more gear wheels and also to provide a rather large reduction from e.g., 3200 RPM to 200 RPM. It is, however, apparent that other gear ratios can be used if desired.

By the invention there is achieved combining a bicycle with shaft transmission with a bicycle with an electric auxiliary motor where the need of service on the mechanical and electric drive train is minimised to a very low level, and where the auxiliary motor is arranged in a very unobtrusive manner. Thus, there is provided a bicycle with many options in use is obtained by combining a sleek and stylish manual transmission system with a compact auxiliary motor. The result is a bicycle with a simple design and with an almost maintenance-free transmission system. The only service needed is recharging of the batteries and occasional oiling of the gear mechanism.

A bicycle comprising a driveshaft transmission system according to the invention can comprise a driveshaft transmission system that comprises an input driveshaft and an output driveshaft, where said input driveshaft is arranged directly or indirectly in connection with the pedals via said crank, where said output driveshaft is arranged directly or indirectly in connection with the hub at said wheel, and where said input driveshaft is connected to said output driveshaft via a clutch. By arranging the driveshaft with an input and an output part joined by a clutch, it is possible to arrange a mechanical or an electric speed and torque sensor at said clutch. Such an embodiment will be disclosed below.

A bicycle comprising a driveshaft transmission system according to the invention can comprise a driveshaft transmission system arranged as a unit, comprising a first mounting interface/flange at a first end and a second mounting interface/flange at a second end, where said bicycle comprises a first interface near the crank for engagement with said first mounting interface/flange and further comprises a second interface near a rear wheel hub for engagement with said second mounting interface/flange.

By arranging the drive shaft transmission system as a single unit it can easily be installed on a bicycle with a traditional frame for a shaft transmission, more or less in the same manner like a driveshaft unit installed on bicycles previously. Only a few electric wires need to be connected to, e.g., a switch at a front wheel brake, to a control panel for engaging or disengaging the auxiliary motor and of course to feed the motor with power from the battery pack. This makes installation very simple, and a rare maintenance job can be made very easily as well as the entire unit can be removed and serviced at a workshop table or while still installed at the bike, if preferred.

A bicycle according to the invention including a driveshaft transmission system according to the above description can also comprise a rear wheel hub, said rear wheel hub comprising a brake mechanism of the coaster brake type. This type of brake is a very efficient and maintenance-free type of brake, with direct connection through the drive shaft, leaving the bicycle with no cables and imparting a tidy and simple appearance. At the same time a very reliable and robust type of brake is provided.

By a bicycle comprising a driveshaft transmission system according to the invention, the electric auxiliary motor can further include a two-way overrunning clutch, the two-way overrunning clutch arranged between the input driveshaft and the output driveshaft. This will enable transmission of power from the pedals to the rear wheel via said driveshaft as the two-way overrunning clutch will engage in the first direction when a torque is applied. The same action takes place when a coaster brake in the rear wheel hub is engaged by applying a backwards kick on the pedals. The only difference is that it is the second direction in the two-way overrunning clutch that engages.

When riding the bicycle and not actively pedalling, the two-way overrunning clutch is not engaged and the bicycle will thus be free-wheeling as known from a common bicycle. The free-wheeling will take place whether the auxiliary motor is engaged or not, providing additional security and a greater comfort when cycling. When riding a bicycle with an electric auxiliary motor, the power to said motor is switched off when the pedals are not used, but with a small delay which may be disturbing. By using a two-way overrunning clutch as describe above this is prevented as the clutch will allow the input driveshaft to be at stand still even though the output driveshaft is still rotating. It has to be mentioned that the electric auxiliary motor of course will be stopped—typically with a small delay—but in order to give the user a more comfortable ride the two-way overrunning clutch is very attractive as the pedals will not be driven by the electric auxiliary motor.

As mentioned above a bicycle including a driveshaft transmission system according to the invention can have a driveshaft transmission system comprising a combined torque and speed sensor comprising an indicator disc and sensing means, said indicator disc comprising at least two zones, namely a first and central zone and a second and outer zone, where said first zone comprises means for installation at one of the input or output driveshaft, where said second zone comprises further means for indirectly engagement with the other of the input or output driveshaft, said indicator disc further comprising one or more slots that extend in a at least partly radial and/or in a at least partly peripheral direction. The indicator disc is arranged between the two driveshaft parts, and when a torque is applied on the input driveshaft, one or more slots in the indicator disc will be deformed, and this deformation will be detected by a sensor, expressing the magnitude of the torque applied to the indicator disc.

The slot or slots can be narrow or wide and will lead to deflection of the first zone in relation to the second zone of the indicator disc to one side when pedalling and to another side when braking. By using a sensor directed towards the indicator disc it is possible to obtain an indication of which way the indicator disc is rotating, i.e. whether a pedalling force or a braking force is applied to the pedals. The sensor can, e.g., be an optic sensor or a magnetic sensor or any other suitable type of sensor. The main task of the sensor is to provide an indication as to whether the electric auxiliary motor should be running or if it should be stopped. This is achieved by processing a signal from said combined torque and speed sensor. As soon as the signal or signals have been processed, the power to the electric auxiliary motor is regulated according to a selected set of parameters, i.e., parameters indicating the applied torque value and/or the pedalling frequency.

A bicycle comprising a driveshaft transmission system according to the invention may have the driveshaft transmission system enclosed in a outer casing, said casing covering the driveshaft, the electric auxiliary motor and all the mechanical components in relation herewith, where said outer casing further comprises and covers an electric control unit for controlling the electric auxiliary motor. In this way, all the elements except for a few electric wires are enclosed in a single unit.

In an embodiment of a vehicle comprising a driveshaft transmission system according to the invention, the electric auxiliary motor comprises control means for interchanging between a first motor function driving the driveshaft transmission system and a second regenerating/charging function charging the battery pack during use of the transmission system and/or during braking, said control means being either manually or automatically operable.

The electric auxiliary motor can be made to be interchangeable between a motor function driving the transmission system and a charging function charging the battery pack during use of the transmission system. The electric auxiliary motor can also be made manually or automatically interchangeable between a motor function and a charging function. The various functions can be programmed into the controller of the motor and can be activated upon various input signals, e.g., from the brakes or from the above mentioned combined torque and speed sensor or from manually input signals via, e.g., a switch or pushbutton.

As mentioned above, the invention further comprises a method for controlling a bicycle comprising a driveshaft transmission system and an electric auxiliary motor according to the above description. The method comprises controlling and graduating the power exerted by said auxiliary motor in relation to the torque applied at the driveshaft via pedalling the pedals of the bicycle. This is done by controlling and regulating the signal to the motor depending on the torque applied by the user. The controller will typically be programmed to start up and shut down via a ramp function when the user is pedalling in order to make the on or off step as smooth and soft as possible, providing improved comfort to the user and avoiding a sharp and noticeable step when engaging or disengaging.

The invention includes a method where the driveshaft transmission system comprises a torque indicator, a speed indicator or a combined torque and speed indicator and also sensing means directed towards said combined torque and speed indicator to detect certain indications at said indicator, where said electric auxiliary motor is engaged and disengaged according to signals from said sensing means, which in turn senses if a torque is applied at the driveshaft in a first direction via the pedals during pedalling, if there is no torque applied or if there is applied a torque at the driveshaft in a second direction via the pedals during activating a coaster brake in the rear wheel hub. If the user is pedalling the motor can be allowed to exert a force relative to the torque applied by the user.

The method according to the invention can include that power from a battery pack to said electric auxiliary motor is switched off when activating one or more brakes on said bicycle, where said switching off is activated by breaking/cutting an electric circuit in connection with the respective brake or in connection with said combined torque and speed indicator and sensing means. Such an electric circuit can comprise a number of micro switches or other types of suitable switches.

The invention is described in more detail with reference to the drawings.

DETAILED DESCRIPTION OF THE INVENTION

Figure 1:
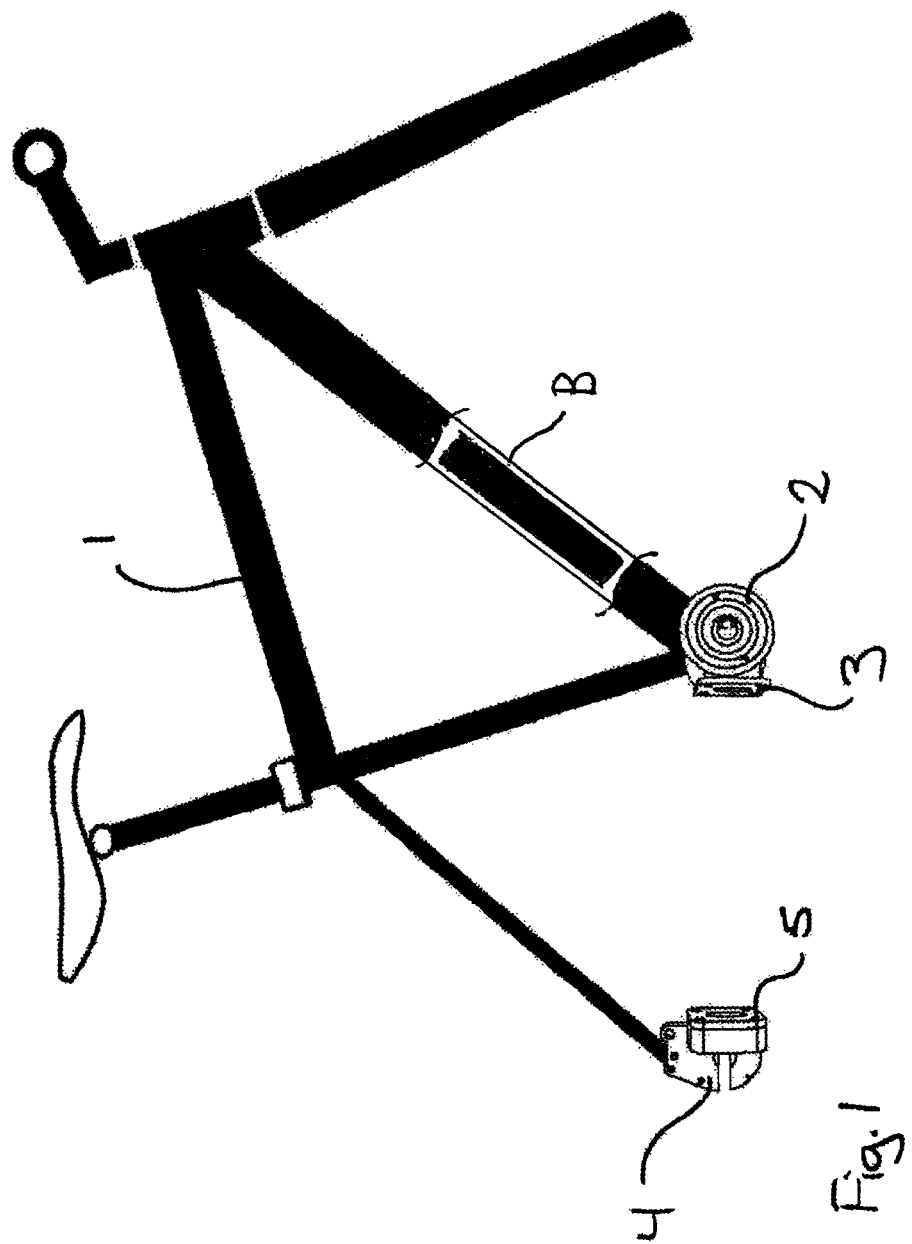
FIG. 1 shows a bicycle frame with interfaces for a driveshaft unit.

FIG. 1 shows a bicycle frame 1 comprising a crank box 2 with a first interface 3, said frame 1 also comprising a gear hub adaptor 4 with a second interface 5. The first and second interfaces 3, 5 are arranged for installing a driveshaft unit 6 (FIG. 5) in between. According to the invention energy exerted by a user on pedals of the bicycle is transformed into rotary energy for rotating a crank, a driveshaft and a hub in a wheel of the bicycle, and where a battery pack B is arranged in the frame 1 and where an electric auxiliary motor, that is provided to assist the user, is arranged at the driveshaft unit 6 (FIG. 4).

Figure 2:
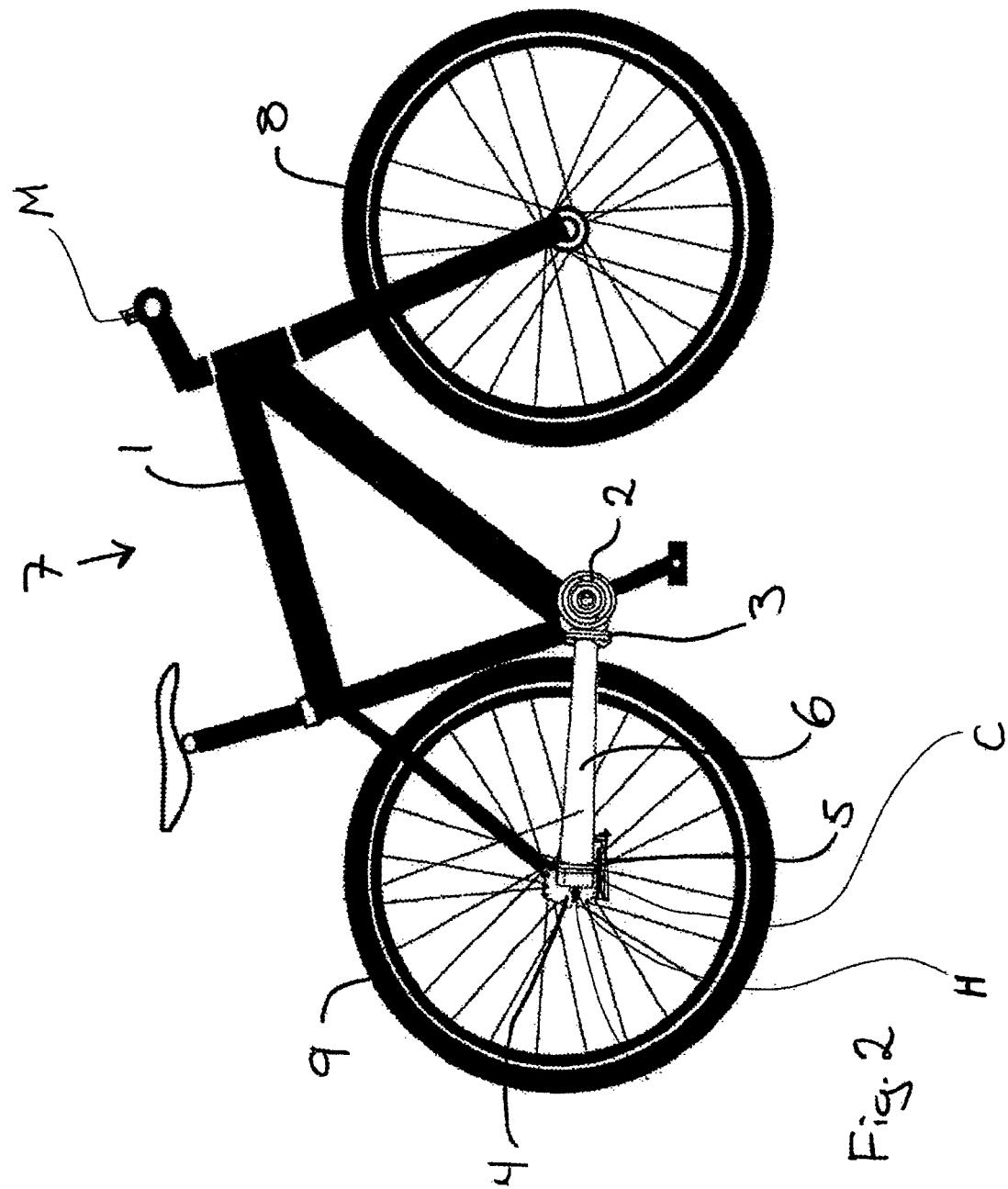
FIG. 2 shows a bicycle with a driveshaft unit installed.

FIG. 2 shows a bicycle 7 with front wheel 8, rear wheel 9 and with a driveshaft unit 6 installed between said first and second interfaces 3, 5. The rear wheel 9 has a hub H and a coaster type brake mechanism C is provided at the hub H. A control means M for interchanging between a first motor function driving the driveshaft transmission system and a second regenerating/charging function charging the battery pack B during use of the transmission system and/or during braking is located at the handle bars.

Figure 3:
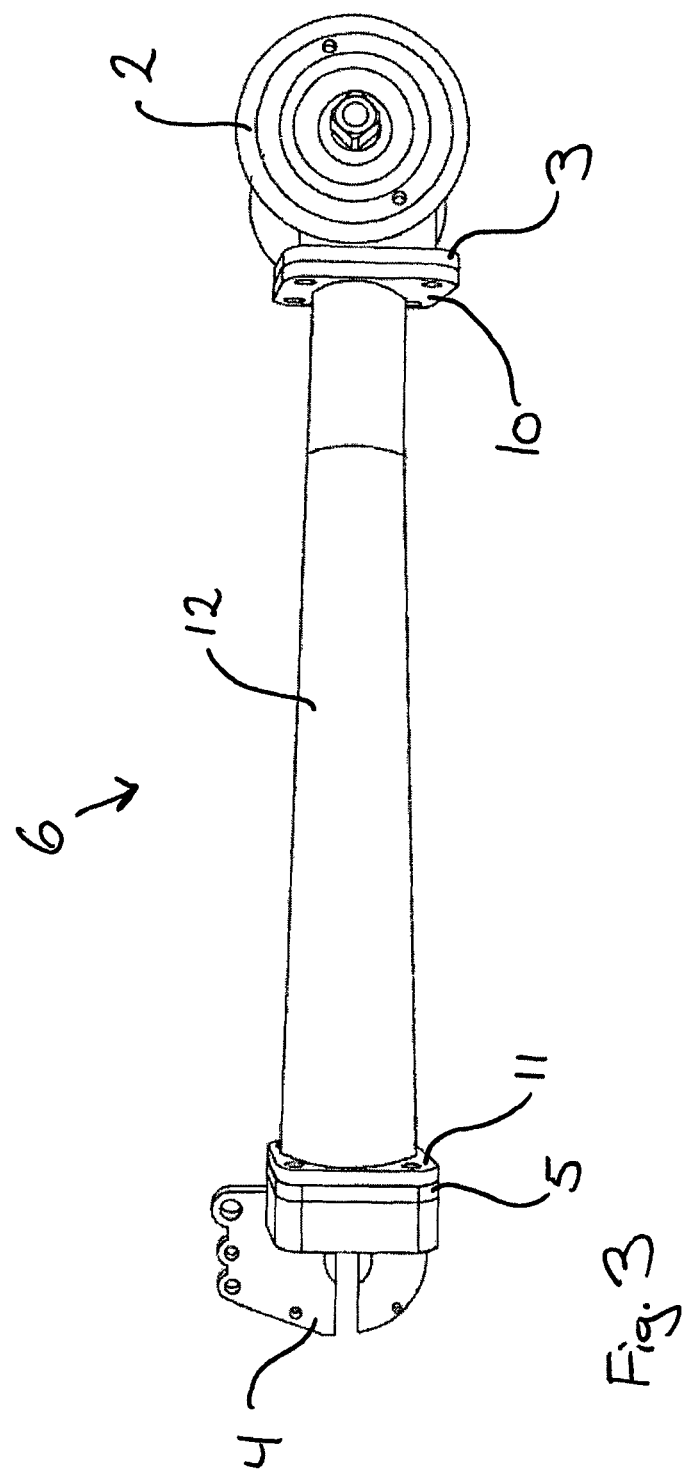
FIG. 3 shows a driveshaft unit.

FIG. 3 shows a driveshaft unit 6, having a first flange 10 and a second flange 11. Between said flanges 10, 11 an outer casing 12 is arranged to contain and to cover the various parts of the drive shaft unit 6.

Figure 4:
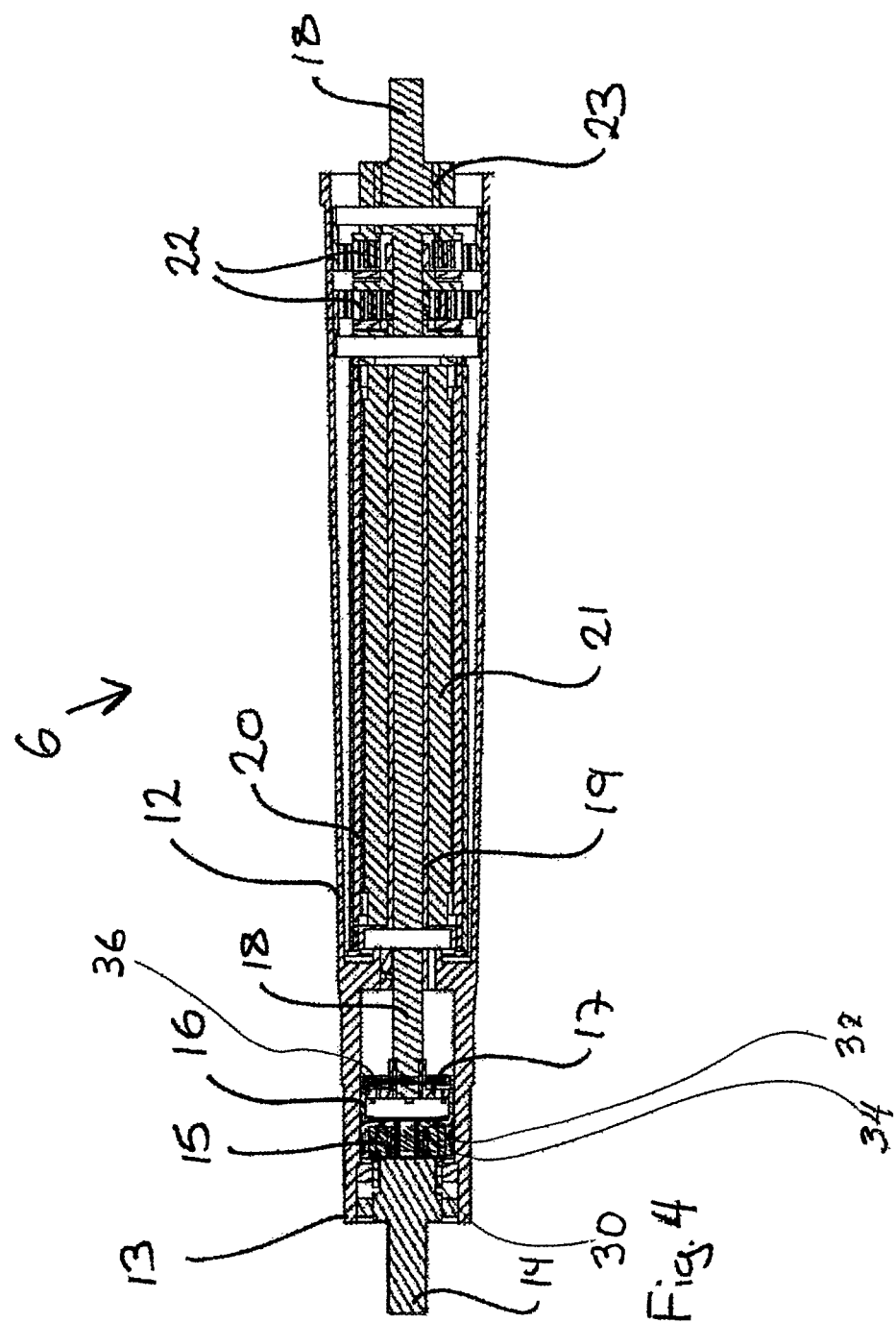
FIG. 4 shows a cross-section of a driveshaft unit.

FIG. 4 shows a cross-section of a driveshaft transmission unit 6. At the first end 13 of the driveshaft transmission unit 6, an input driveshaft 14 is arranged with a one-way overrunning clutch 15 and with a bracket 16 for an indicator disc 17. The indicator disc 17 is arranged at the output driveshaft 18 extending through the hollow rotor axle 19. The driveshaft transmission unit 6 is built with an external rotor type motor and the rotor 20 is thus arranged around the stator 21. At the end of the rotor 20 and stator 21 two planetary gears 22 are arranged as a two-stage gear which enables transforming a large number of revolutions to a rather small number of revolutions. Together with the planetary gears 22 a two-way overrunning clutch 23 is arranged in order to allow power to be transmitted from the pedals during pedalling or braking as the two-way overrunning clutch 23 only will engage when a torque is applied. The driveshaft transmission unit 6 also comprises a combined torque and speed sensor 30 comprising indicator disc 17, speed sensor 32 and torque sensor 34.

Figure 5:
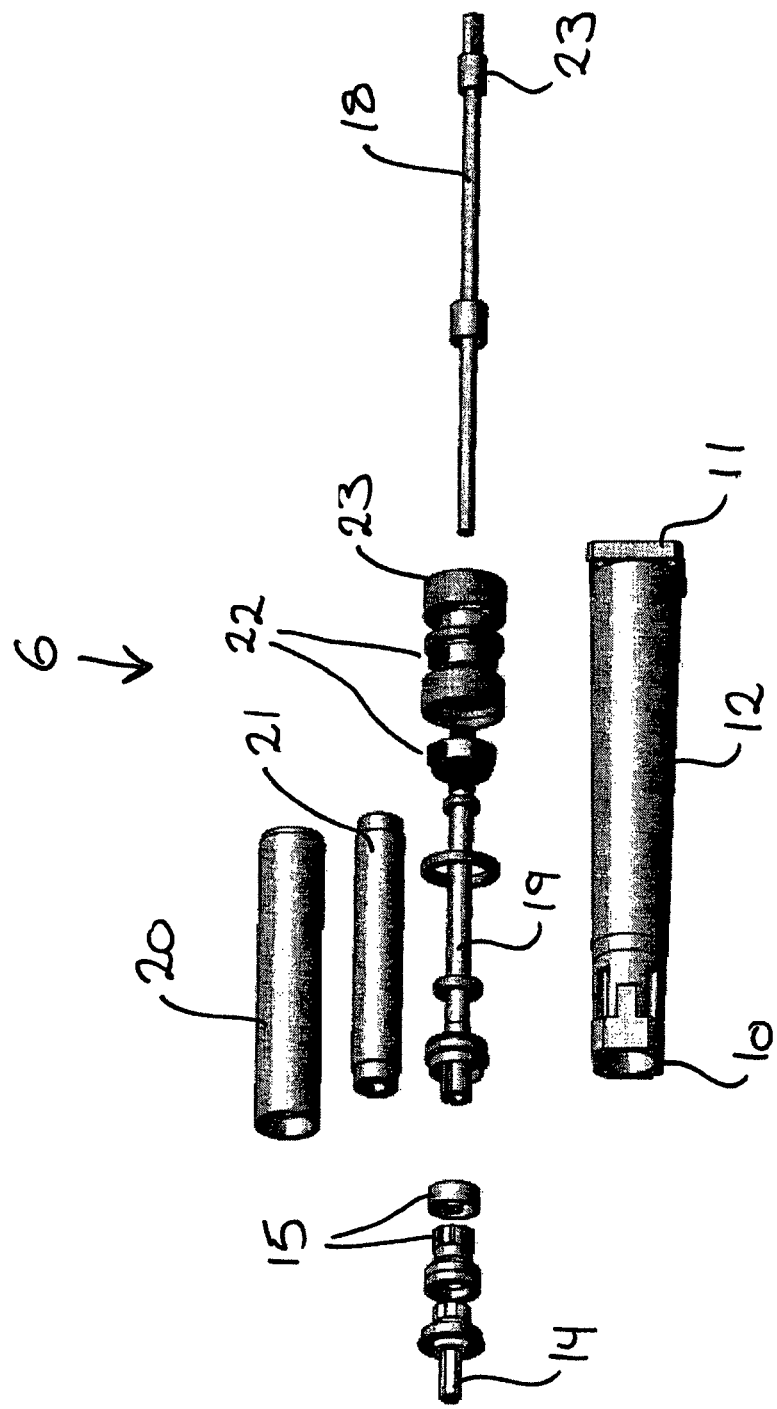
FIG. 5 shows a drive shaft unit in exploded view.

FIG. 5 shows a drive shaft unit 6 in exploded view, showing practically the same parts as seen in FIG. 4.

Figure 6:
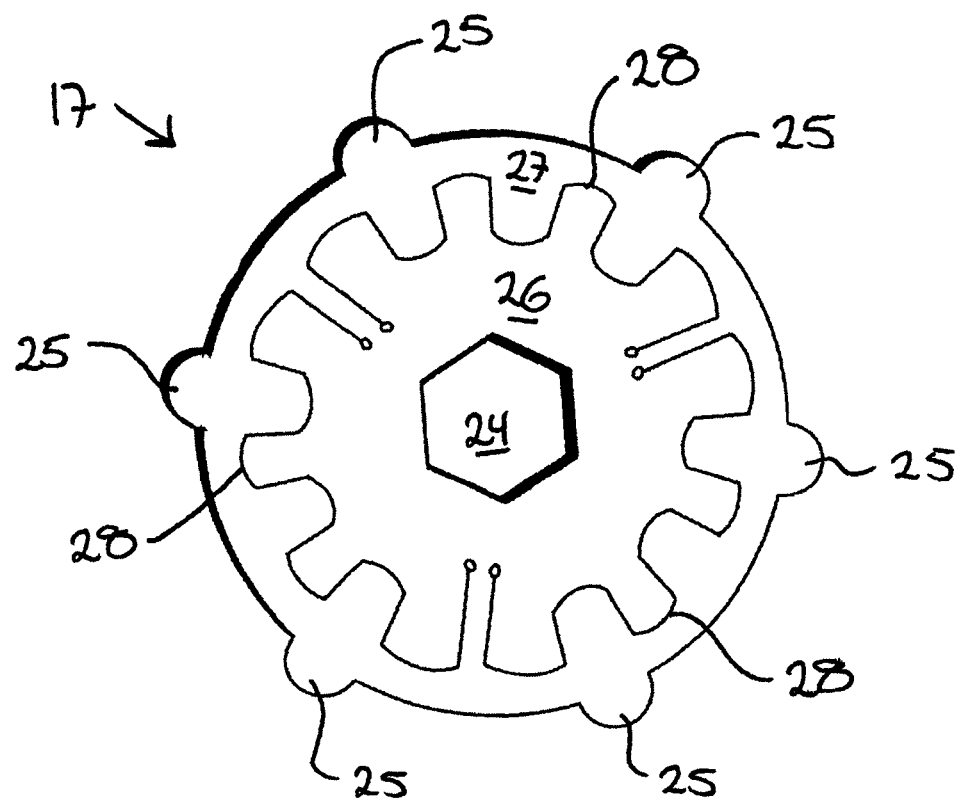
FIG. 6 shows an indicator disc.

FIG. 6 shows an indicator disc 17 with a central hole 24 that serves as the means for installation of disc 17 by engagement with the input drive shaft 14 (seen in FIGS. 4 and 5). At the periphery of the indicator disc a number of protrusions 25 are arranged for engagement with a not shown bracket 16. The indicator disc is divided into a central zone 26 and an outer zone 27. The two zones 26, 27 are divided by three narrow slots 28. The slots 28 are shaped as a number of teeth engaging each other, and when the indicator disc 17 is exposed to a torque between the central zone 26 and the outer zone 27 when pedalling a bicycle, the slots 28 will deform and thus indicate an applied torque. Such a deformed slot can be detected by suitable sensing means 36 arranged near the indicator disc 17.

The slot or slots 28 can be narrow or wide and will lead to deflection of the first zone in relation to the second zone of the indicator disc 17 to one side when pedalling and to another side when braking. By using sensing means 36 directed towards the indicator disc 17, it is possible to obtain an indication of which way the indicator disc is rotating, i.e., whether a pedalling force or a braking force is applied to the pedals. The sensing means 36 can, e.g., be an optic sensor or a magnetic sensor or any other suitable type of sensor. The main task of the sensing means 36 is to provide an indication as to whether the electric auxiliary motor should be running or if it should be stopped. This is achieved by processing a signal from the combined torque and speed sensor 30. As soon as the signal or signals have been processed, the power to the electric auxiliary motor is regulated according to a selected set of parameters, i.e., parameters indicating the applied torque value and/or the pedalling frequency.

What is claimed is:

1. A vehicle comprising a driveshaft transmission system, comprising a driveshaft and a hub at a wheel of said vehicle, where said vehicle further comprises a battery pack and an electric motor for propelling said vehicle, said motor being arranged at said driveshaft, wherein the motor is of the external rotor type, comprising a inner stator part and an outer rotor part, said inner stator part having a central passage for said driveshaft, where said driveshaft transmission system comprising said auxiliary motor further comprises a planetary gear and a one-way overrunning clutch, said one-way overrunning clutch and said planetary gear being arranged between the driveshaft and the rotor part.

2. A vehicle comprising a driveshaft transmission system according to claim 1, wherein said vehicle is a bicycle where energy exerted by a user on pedals is transformed into rotating energy for rotating a crank, a driveshaft and a hub at a wheel of said bicycle, and where said electric motor is an electric auxiliary motor for assisting said user, said auxiliary motor being arranged at said driveshaft.

3. A vehicle comprising a driveshaft transmission system according to claim 2, wherein said driveshaft in said driveshaft transmission system comprises an input driveshaft and an output driveshaft, where said input driveshaft is arranged directly or indirectly in connection with the pedals via said crank, where said output driveshaft is arranged directly or indirectly in connection with the hub at said wheel, and where said input driveshaft is connected to said output driveshaft via a clutch.

4. A vehicle comprising a driveshaft transmission system according to claim 2, wherein the driveshaft transmission system is arranged as a unit, comprising a first mounting interface/flange at a first end and a second mounting interface/flange at a second end, where said vehicle comprises a first interface near the crank for engagement with said first mounting interface/flange and further comprises a second interface near a rear wheel hub for engagement with said second mounting interface/flange.

5. A vehicle comprising a driveshaft transmission system according to claim 1, wherein the vehicle comprises a rear wheel hub, said rear wheel hub comprising a brake mechanism of the coaster brake type.

6. A vehicle comprising a driveshaft transmission system according to claim 1, wherein the electric motor further comprises a two-way overrunning clutch, said two-way overrunning clutch being arranged between the input driveshaft and the output driveshaft.

7. A vehicle comprising a driveshaft transmission system according to claim 1, wherein the driveshaft transmission system comprises a torque sensor, a speed sensor or a combined torque and speed sensor, comprising an indicator disc and sensing means, said indicator disc comprising at least two zones, namely a first and central zone and a second and outer zone, where said first zone comprises means for installation at one of the input or output driveshaft, where said second zone comprises further means for indirectly engagement with the other of the input or output driveshaft, said indicator disc further comprising one or more slots that extend in a at least partly radial and/or in a at least partly peripheral direction.

8. A vehicle comprising a driveshaft transmission system according to claim 1, wherein the driveshaft transmission system is enclosed in an outer casing, said casing covering the driveshaft, the electric motor and all the mechanical components in relation herewith, where said outer casing further comprises and covers a electric control unit for controlling the electric motor.

9. A vehicle comprising a driveshaft transmission system according to claim 1, wherein the electric motor comprises control means for interchanging between a first motor function driving the driveshaft transmission system and a second regenerating/charging function charging the battery pack during use of the transmission system and/or during braking, said control means being either manually or automatically operable.

10. A method for controlling a vehicle comprising a driveshaft transmission system, comprising a driveshaft and a hub at a wheel of said vehicle, where said vehicle further comprises a battery pack and an electric motor for propelling said vehicle, said motor being arranged at said driveshaft, wherein the motor is of the external rotor type, comprising a inner stator part and an outer rotor part, wherein the method comprises controlling and graduating the power exerted by said motor.

11. A method according to claim 10, wherein the method comprises controlling and graduating the power exerted by an electric auxiliary motor in relation to a torque applied at the driveshaft via pedalling the pedals of the bicycle.

12. A method according to claim 11, wherein the driveshaft transmission system comprises a torque indicator, a speed indicator or a combined torque and speed indicator and also comprises sensing means directed towards said combined torque and speed indicator to detect certain indications at said indicator, where said electric auxiliary motor is engaged and disengaged according to signals from said sensing means which in turn senses if a torque is applied on the driveshaft in a first direction via the pedals during pedalling, if there is no torque applied or if a torque is applied on the driveshaft in a second direction via the pedals during activating a coaster brake in the rear wheel hub.

13. A method according to claim 10, wherein power from a battery to said electric motor is switched off when activating one or more brakes on said vehicle, where said switching off is activated by breaking an electric circuit in connection with the respective brake or in connection with said combined torque and speed indicator and sensing means.

* * * * *